United States Patent [19]
Yamamoto et al.

[11] Patent Number: 4,633,522
[45] Date of Patent: Dec. 30, 1986

[54] APPARATUS FOR EMITTING AND RECEIVING LIGHT SIGNALS, MORE PARTICULARLY INFRARED SIGNALS

[75] Inventors: Koichi Yamamoto; Yoshihisa Fujioka, both of Kanagawa, Japan

[73] Assignee: Sony Corporation, Tokyo, Japan

[21] Appl. No.: 683,804

[22] Filed: Dec. 19, 1984

[30] Foreign Application Priority Data
   Jan. 24, 1984 [JP]   Japan ................. 59-7163[U]

[51] Int. Cl.⁴ .............................. H04B 9/00
[52] U.S. Cl. ................. 455/603; 250/237 R; 455/606
[58] Field of Search ......... 455/603, 606, 607, 617, 455/618; 250/237 R; 357/19; 358/194.1

[56] References Cited
U.S. PATENT DOCUMENTS

| | | | |
|---|---|---|---|
| 2,404,696 | 7/1946 | Deal ................. | 455/607 |
| 3,842,263 | 10/1974 | Kornrumpf et al. ....... | 357/19 |
| 4,150,824 | 4/1979 | Villa ................. | 455/617 |
| 4,291,411 | 9/1981 | Muller et al. ......... | 455/603 |

FOREIGN PATENT DOCUMENTS
52-42388  4/1977  Japan ................. 455/606

OTHER PUBLICATIONS
Funkschau-Television Sound Transmission by Infrared-vol. 47, No. 17, pp. 56-58-14 Aug. 1975.

*Primary Examiner*—Joseph A. Orsino, Jr.
*Attorney, Agent, or Firm*—Hill, Van Santen, Steadman & Simpson

[57] ABSTRACT

There serves to emit light signals, more particularly infrared signals, and to receive such signals, an apparatus in which a light emitting arrangement (15) and a light receiving arrangement (20) are arranged in or behind a plate (32) which is translucent or transparent to said light signals or infrared signals. At least one surface of the plate (32) has such a finish between the light emitting arrangement (15) and the light receiving arrangement (20) that light rays are impeded or prevented from being passed on within the plate (32).

7 Claims, 6 Drawing Figures

FIG.1
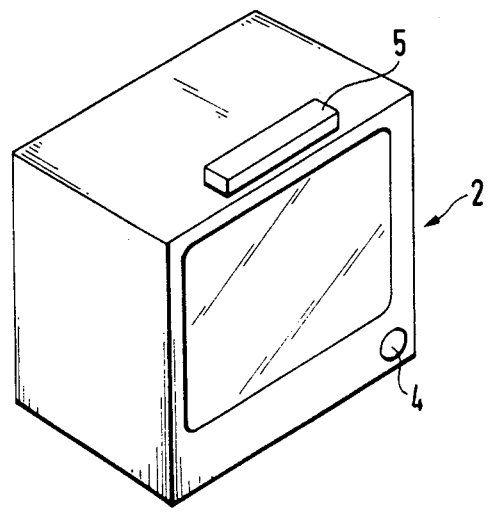
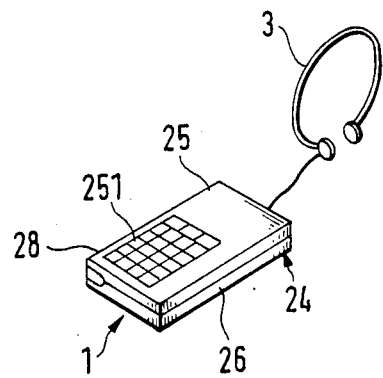

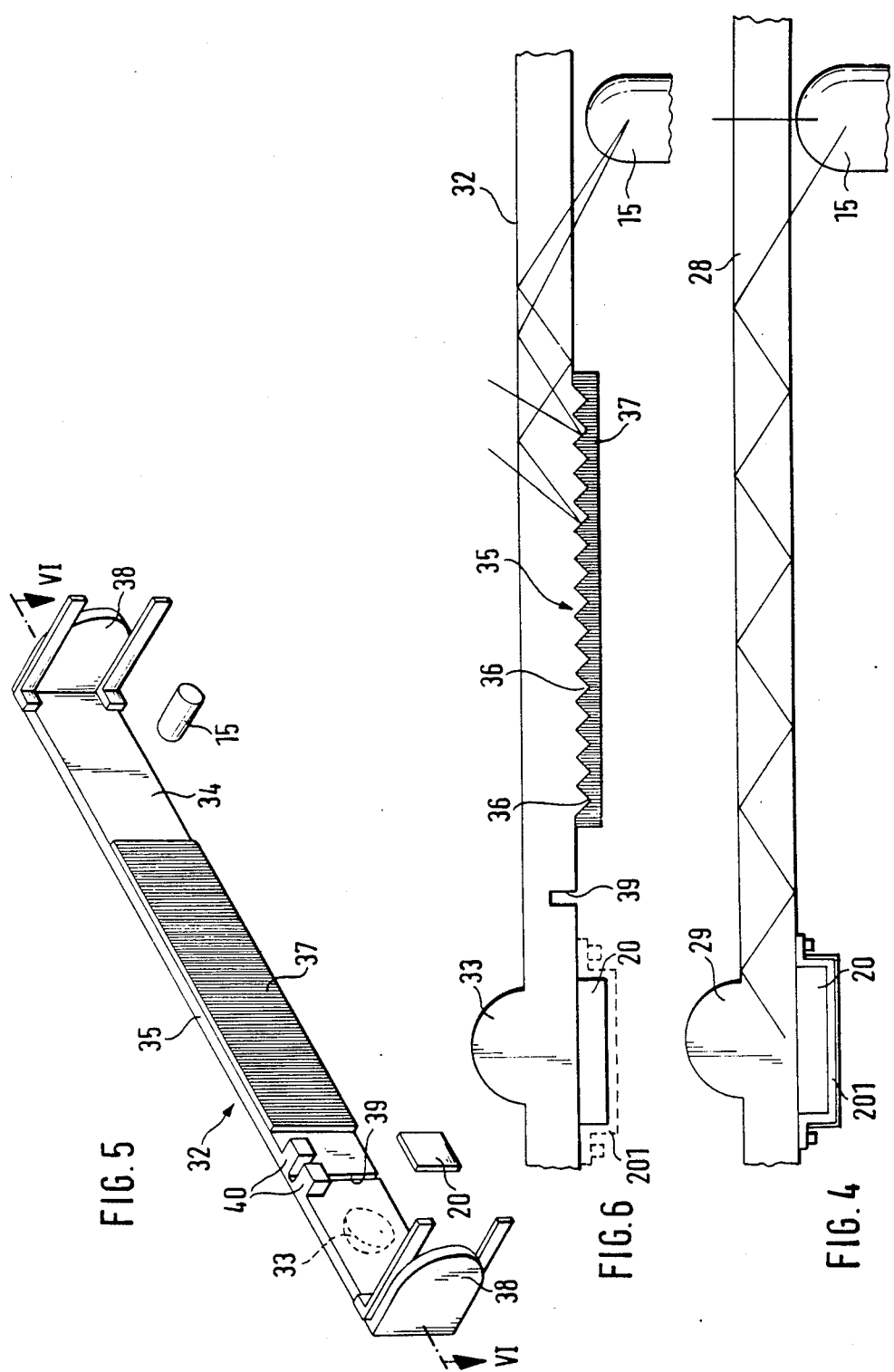

APPARATUS FOR EMITTING AND RECEIVING LIGHT SIGNALS, MORE PARTICULARLY INFRARED SIGNALS

FIELD OF INVENTION

The invention relates generally to an apparatus having a light emitting arrangement for emitting light signals, more particularly infrared signals, to at least one device receiving such signals and having a light receiving arrangement for receiving corresponding light signals from at least one device emitting such light signals.

BRIEF DESCRIPTION OF THE PRIOR ART

It is customary to use infrared remote control equipment in connection with the remote control of equipment pertaining to entertainment electronics, more particularly television receivers and video recorders. This infrared remote control equipment emits infrared signals for the purpose of adjusting the various functions of the equipment in response to corresponding operation of the keys.

Furthermore, it is already known to transmit the audio signals of a television receiver by means of an infrared transmission system and to provide audible headphones. The infrared transmission system in that case comprises an infrared transmitter which is connected to an audio signal output of the television receiver in question. The headphones are connected with an infrared receiver which allows the respective infrared signals transmitted from the infrared transmitter to be received and to be converted into signals which are audible over the headphones.

It has become apparent that when operating an infrared remote control system and an infrared audio signal transmission system of the aforesaid kind, problems can arise owing to the fact that infrared signals emitted from the infrared remote control system are received by the infrared receiver of the infrared audio signal transmission system.

OBJECT OF THE INVENTION

Accordingly, the underlying object of the invention is to develop, with comparatively little expense in terms of construction, an apparatus for emitting and receiving light signals, more particularly infrared signals, so that substantially interference-free transmission of light signals, more particularly infrared signals, is ensured both in the direction of transmission and in the direction of reception.

A further object of the invention is to be able to manage with an especially simple covering plate for the light emitting arrangement and the light receiving arrangement.

A yet further object of the invention is to make especially effective the protection against disturbing influence of the light receiving arrangement by light emitted from the light transmitting arrangement.

A yet further object of the invention is especially effectively to impede the light path inside the said plate from the light emitting arrangement to the light receiving arrangement.

A yet further object of the invention is to provide effective protection from rays passing through otherwise unhindered in the longitudinal direction of the said plate.

A still further object of the invention is to protect at least one surface of said plate from the penetration from the outside therethrough of disturbing light beams.

A still further object of the invention is to increase in a simple manner the effectiveness of the light receiving arrangement.

A still further object of the invention is to combine a key board and an audio receiver such that remote operation adjustment signals entered by means of the key board can be transmitted over an infrared transmission path to a receiving arrangement to be adjusted and, additionally, so that audio signals from this receiving arrangement can be transmitted over a further infrared light path to said audio receiver.

SUMMARY OF THE INVENTION

The first above-mentioned object is achieved according to the invention by an apparatus of the kind specified in the introduction by accommodating the light emitting arrangement and the light receiving arrangement, spaced apart from each other, in or behind a plate, which is translucent to the light emitted from the light emitting arrangement and to the light to be received by the light receiving arrangement, and at least one surface of which has a surface finish, in the area between the light emitting arrangement and the light receiving arrangement, impeding light rays from being passed on from the light emitting arrangement to the light receiving arrangement within said plate.

The invention has the advantage that in total comparatively little constructional expense is sufficient in order to ensure substantially interference-free operation when transmitting light signals in both directions. Namely, according to the invention, a single plate, which is both simple to produce and easy to install and which, additionally, gives the whole apparatus a better appearance from the point of view of shape, is sufficient. With regard to interference-free operation it is to be noted that an increased impedance to cross-interference between the two light signal paths is achieved by the invention.

Preferably, said surface of the plate is roughened. This gives the advantage that the surface in question can be produced particularly easily.

Said surface of the plate advantageously has a ribbing cross-wise with respect to the possible direction of propagation of the light from the light emitting arrangement to the light receiving arrangement. This results in particularly effective protection against interference of the light receiving arrangement by the light emitted from the light emitting arrangement.

The previously mentioned ribbing is advantageously produced in a saw-tooth form. The light path from the light emitting arrangement to the light receiving arrangement within the plate is thereby interrupted in a particularly effective manner.

Said surface of the plate preferably has at least one area of reduced thickness extending over the plate in question cross-wise in respect of the possible direction of propagation of the light from the light emitting arrangement towards the light receiving arrangement. This measure, which, if necessary, can be taken in addition to the previously mentioned measure, represents effective protection against rays which otherwise pass through without hindrance in the longitudinal direction of the plate in question.

Said plate preferably has a black coating on at least one of its surfaces. This has the advantage that the surface in question is protected from penetration by interfering rays. The effectiveness of the light receiving arrangement can be improved thereby in a particularly simple manner.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 1 represents perspectively a system for transmitting light signals;

FIG. 4 shows an enlarged sectional view along the intersection line IV—IV of a front plate of the apparatus represented in FIG. 3.

FIG. 5 shows a perspective view of the front plate developed according to the invention for the apparatus shown in FIG. 3.

FIG. 6 shows an enlarged cutaway portion of the front plate shown in FIG. 5 along the intersection line VI—VI therein.

DETAILED DESCRIPTION OF THE INVENTION

Figure 2:
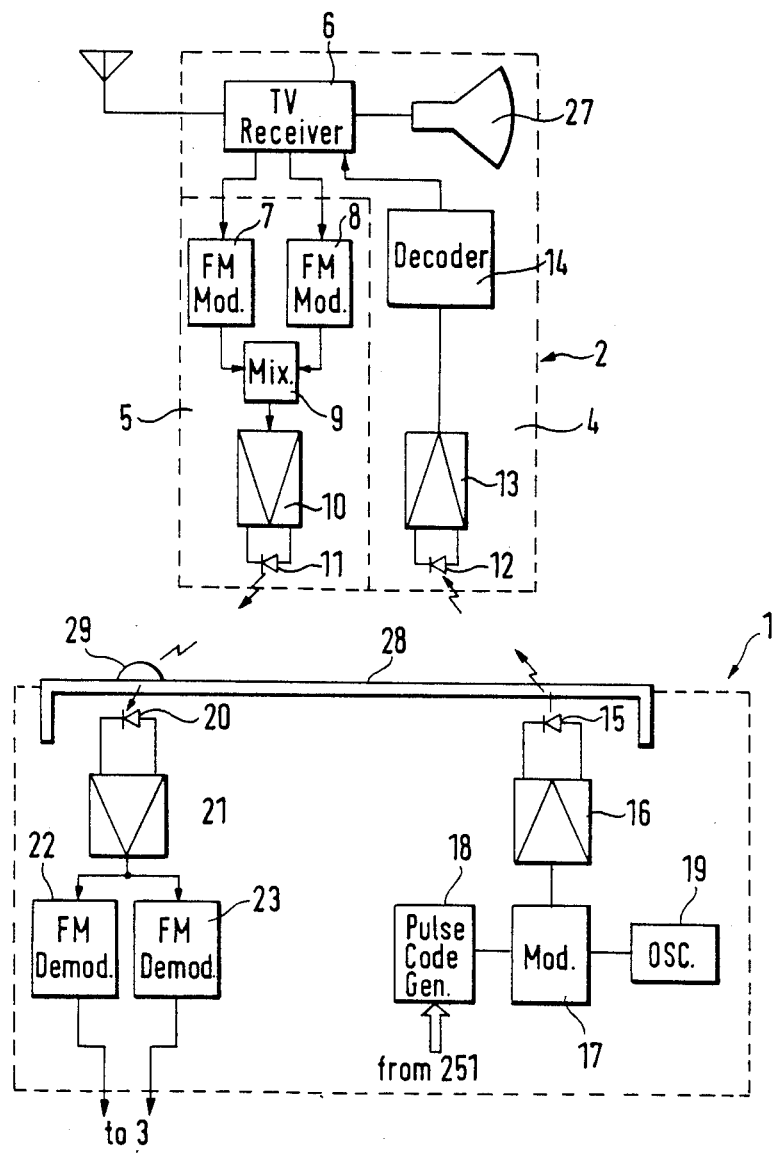
FIG. 2 diagrammatically shows in a block circuit the principle construction of a device or an apparatus appertaining to the system according to FIG. 1.

FIG. 1 represents a system serving to transmit light signals and more particularly infrared signals, to which system a remote control apparatus 1 and a television receiver 2 belong. Headphones 3, which are to reproduce audio signals which originate from the television receiver 2, are connected to the remote control apparatus 1. The television receiver has a signal receiving arrangement 4 for receiving the light signals emitted from the apparatus 1 and a light signal emitting arrangement 5 which emits light signals corresponding to the audio signals.

The apparatus 1 comprises, according to FIG. 1, a housing 24 which consists of an upper housing portion 25 and of a lower housing portion 26. A front plate 28, in or behind which a light emitting arrangement and a light receiving arrangement are located, is shown at the front of the housing 24 in FIG. 1. The light emissions are effected by operation of the keys 251.

In FIG. 2 a block circuit diagram shows the essential construction of the system represented in FIG. 1. The remote control apparatus 1 is shown in greater detail in the lower portion of FIG. 2 and the essential construction of the television receiver 2 is shown in the upper portion of FIG. 2. The television receiver 2 comprises a television receiving section 6 which is connected to the light receiving arrangement 4 and to the light emitting arrangement 5. The light emitting arrangement 5 has two FM modulators 7, 8 which serve, for example, to modulate the audio signals corresponding to the right-hand and left-hand sound channels and the carrier frequencies of which are chosen so that they are different from each other, such as 525 kHz and 875 kHz.

The outputs of the two FM modulators 7, 8 are connected to a mixer 9 which mixes the modulated signals and which passes its output signals to an amplifier 10 which feeds a light emitting diode 11. This light emitting diode 11 is an infrared light emitting diode in the present case.

The light signal receiving arrangement 4 of the television receiver 2 has a photodiode 12 which is particularly responsive to infrared rays. The output of photodiode 12 is connected to an amplifier 13 to which a decoder 14 is in turn connected. This decoder 14 serves to supply control signals with the aid of which the television receiving circuit 6 is controlled with regard, for example, to channel control, volume and mains switching. On the output side the television receiving circuit produces a video signal for a picture tube 27 and audio signals for the left-hand and right-hand sound channels.

The circuit arrangement of the remote control apparatus 1 represented in the lower portion of FIG. 2 comprises a light emitting arrangement emitting, in the present case, infrared signals and a light receiving arrangement receiving infrared signals. An infrared light emitting diode 15 which is connected to the output of an amplifier 16, the input of which is connected to the output of a modulator 17, belongs to the light emitting arrangement. One input of this modulator 17 is connected to the output of a pulse code generator 18 and a further input of the modulator 17 is connected to the output of an oscillator 19 which supplies a carrier signal for the modulator 17, the carrier signal being modulated therein by the signals or pulses emitted by the pulse code generator 18. The pulse code generator 18 has its input connected to the keys 251.

To the light receiving arrangement of the remote control apparatus 1 there belongs a photodiode 20, the output of which is connected to the input of an amplifier 21, the output of which is in turn connected to the inputs of two FM demodulators 22, 23 which demodulate the signals supplied to them to provide audio signals at the output for the right-hand and left-hand sound channels, that is, signals which correspond to those signals which have been supplied to the FM modulators 7 or 8.

Front plate 28, which is translucent to the light emitted from the light emitting diode 15 and to the light to be received by the photodiode 20, belongs, additionally, as shown in FIG. 2, to the remote control apparatus 1. In the present case the plate 28 in question is translucent to infrared light. In front of the photodiode 20 the plate 28 has a lens portion 29 which focuses the infrared light arriving at this area onto the photodiode 20.

Figure 3:
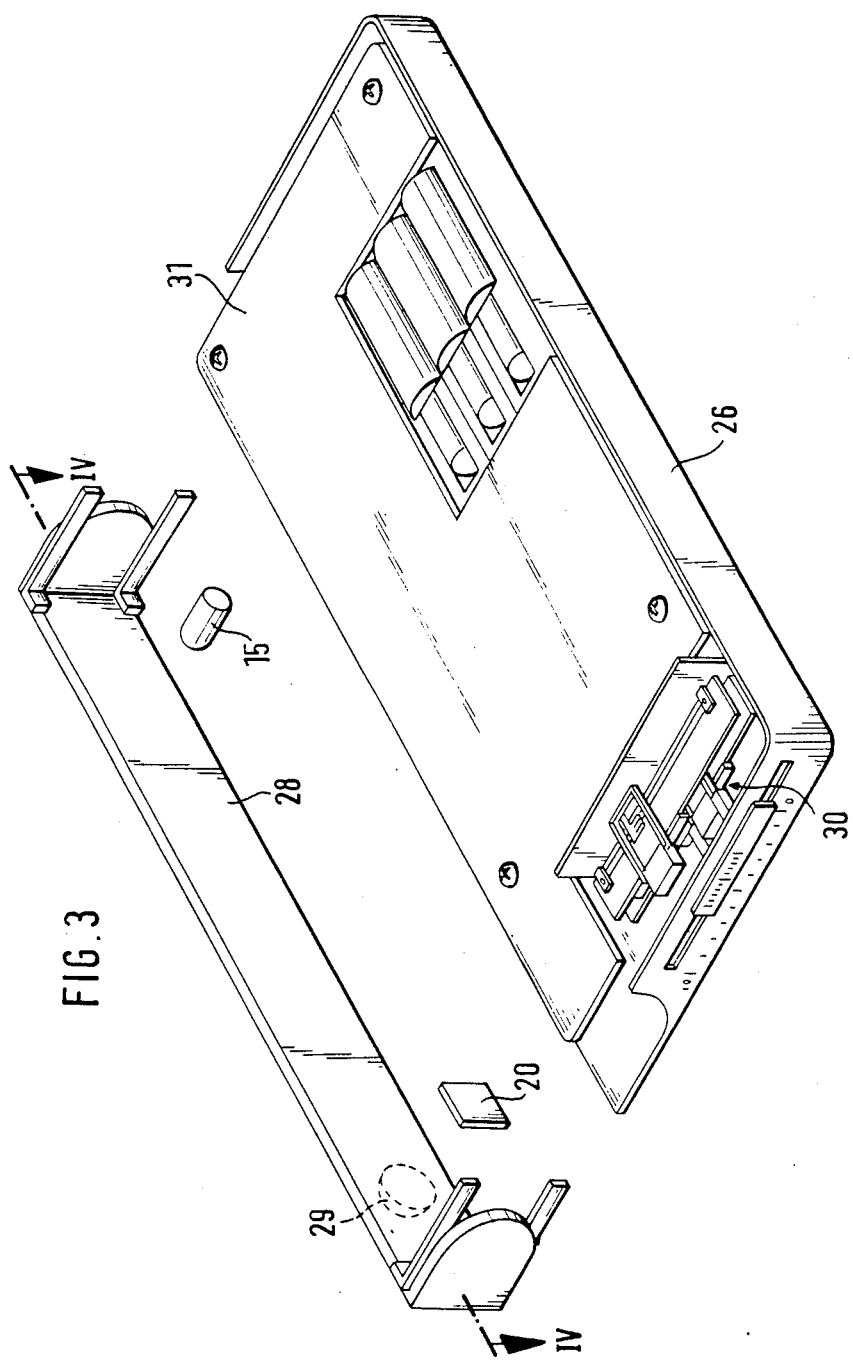
FIG. 3 shows a perspective exploded view of the basic construction of the apparatus for transmitting and receiving light signals appertaining to the system according to FIG. 1.

The remote control apparatus according to FIG. 1 is illustrated in FIG. 3 in a perspective exploded view showing its essential elements. Merely the lower portion of the housing 26 and the previously mentioned front plate 28 are shown in greater detail. An adjusting device 30 and a printed circuit board 31 are located in the lower portion of the housing 26. The adjusting device 30, in the present case, should be a volume adjusting device with the aid of which the level of the output signals to be supplied to the headphones 3, according to FIG. 1, can be adjusted. The printed circuit card can comprise the circuit portions mentioned in FIG. 2 with regard to the remote control apparatus 1. Furthermore, a battery compartment for accommodating supply batteries can be contained in the lower portion of the housing 26.

As regards the front plate 28, FIG. 3 shows that this plate has the lens portion 29, behind which the photodiode 20 is located, in its left-hand area. The light emitting diode 15 is located at a distance from the photodiode 20, likewise behind the plate 28.

A sectional view of the front plate 28 shown in FIG. 3 taken along the intersection line IV—IV marked is shown in FIG. 4 in a cutaway portion. Furthermore, FIG. 4 shows the light emitting diode 15 and also the photodiode 20 which is mounted at the back of the plate 28 at the location at which, on the front of the plate, the lens portion 29 is provided. The photodiode 20, in the present case, is screened in a light-proof manner by means of a screening arrangement 201 at the back of the plate 28.

It can be seen from FIG. 4 that the light emitting diode 15 does not solely send out light rays such that they pass through the plate 28. On the contrary, the light emitting diode 15 also emits light rays which can propagate in the plate 28, this being indicated by a zig-zag line in the plate. These light rays can reach the photodiode 20 practically without hindrance in the case of the construction shown in FIG. 4 and give rise thereby to interference.

FIG. 5 shows a front plate for a remote control apparatus 1 constructed according to the invention. This front plate is referenced 32 in FIG. 5. Between its light emitting area 34, for the light emitting diode 15, and its light receiving area, for the photodiode 20, with the lens portion 33 being located on the exterior of the latter area, said front plate 32 has a surface area 35 which has such a surface finish that light rays are impeded or prevented from being further passed on from the light emitting area 34 towards the photodiode 20 within the plate 32. The surface area 35 is, as can be seen in FIG. 5, a roughened surface area which is formed in this case by a saw-tooth shaped ribbing. In the present case, this surface area is coated in addition with a black coloured layer 37 which allows the infrared rays to be absorbed.

Furthermore, the plate 32 has an area of reduced thickness extending over the whole height of said plate, in the form of a groove 39 in or adjacent the light or infrared light receiving area in which the photodiode 20 is located. Two projections 40 stand out from the back of the plate 32, as can be seen in FIG. 5, on both sides of this area of attenuation 39. These projections 40 merely serve, in the present case, to secure the upper portion of the housing.

The portions 38 shown in FIG. 5 also merely serve for securing purposes.

FIG. 6 shows an enlarged cutaway portion of the plate shown in FIG. 5 taken along the in ersection line VI—VI. The position of the roughened surface area 35 at the back of the plate 32 can be seen clearly from FIG. 6. It can be seen that the rough surface 36 gives rise to random reflection of the rays emitted from the light emitting diode 15 into the plate 32. This reflection is effective in such a way that practically none of the rays emitted from the light emitting diode 15 reach the photodiode 20. The photodiode 20 is, on the contrary, merely able to receive rays which are supplied to it through the lens portion 33.

With regard to the roughened surface area 35, it may also be noted in FIG. 6 that this area is coated with a black layer 37.

Also, from FIG. 6 it can be seen that the thinned area or area of reduced thickness 39 extends into the plate 32, i.e. in the present case, away from the roughened surface 36. The area of reduced thickness in question ensures, as already indicated above, that no straight path is present for light passing through from the light emitting diode 15 to the photodiode 20 within the plate 32, that is, specifically on that side on which the photodiode 20 is mounted on the plate 32. The photodiode 20 is also screened here in a lightproof manner by means of a screening portion 201.

Although the light emitting diode 15 and the photodiode 20 are shown as being positioned behind the plate 32, they can, of course, be mounted in recesses in the plate 32, if this is of sufficient thickness at the areas where the diodes are to be positioned.

In all, there is thus available a plate 32 which can be produced in a particularly simple manner and which can be installed easily and through which a high impedance to cross-interference between the two light transmission channels is achieved.

What is claimed is:

1. Apparatus having a light emitting arrangement for sending out light signals, more particularly infrared signals, to at least one device receiving such signals, and having a light receiving arrangement for picking up corresponding light signals from at least one device emitting such light signals, the apparatus further comprising a planar plate behind which the light emitting arrangement and the light receiving arrangement are mounted and spaced a substantial distance from each other, the plate being transparent or translucent to the light emitted from the light emitting arrangement and to the light to be received by the light receiving arrangement and having at least one surface, in the area between the light emitting arrangement and the light receiving arrangement, which is roughened so as to impede the passage of light rays from the light emitting arrangement to the light receiving arrangement within said plate.

2. Apparatus according to claim 1, wherein said plate has at least one area of reduced thickness which extends cross-wise of said plate between the light emitting arrangement towards the light receiving arrangement.

3. Apparatus according to claim 1, wherein the plate has a black coating on at least one of its surfaces.

4. Apparatus according to claim 1, wherein the plate has a lens portion in the region of the light receiving arrangement.

5. Apparatus according to claim 1, wherein said roughened one surface of the plate is formed with a ribbing which extends cross-wise with respect to the possible direction of propagation of the light from the light emitting arrangement towards the light receiving arrangement.

6. Apparatus according to claim 5, wherein the ribbing is formed in a saw-tooth shape.

7. A combination of a keyboard and an audio receiver, which are together connected over infrared signal paths to a device, which emits at least audio signals and which is controllable by means of the keyboard through infrared signals, the combination comprising a plate, transparent to infrared light, behind which are positioned an infrared signal emitter, for the emission of infrared signals originated by operation of the keyboard, and an infrared signal receiver, for the receiving of audio information containing infrared signals, and wherein the plate has at least one surface, in the area between the infrared signal emitter and the infrared signal receiver, which has a roughened surface finish that impedes the further passage of infrared light rays from the infrared signal transmitter to the infrared signal receiver within said plate.

* * * * *